United States Patent [19]

Iijima

[11] Patent Number: 5,452,028
[45] Date of Patent: Sep. 19, 1995

[54] EYEGLASS FRAME AND METHOD OF MAKING SAME

[76] Inventor: Toshiko Iijima, 2-1, Shirosaki-Cho, 9-Chome, Takefu-Shi, Fukui-Ken, Japan

[21] Appl. No.: 184,398

[22] Filed: Jan. 21, 1994

Related U.S. Application Data

[63] Continuation-in-part of Ser. No. 842,068, Feb. 26, 1992, abandoned.

[30] Foreign Application Priority Data

Apr. 12, 1991 [JP] Japan ................. 3-108759

[51] Int. Cl.⁶ ......................................... G02C 5/02
[52] U.S. Cl. ...................... 351/124; 351/41; 351/111
[58] Field of Search .............. 351/124, 41, 106, 129, 351/111, 117

[56] References Cited

U.S. PATENT DOCUMENTS 4,952,044 8/1990 Murai .......................... 351/41
4,983,029 1/1991 Sato ............................ 351/41

*Primary Examiner*—William L. Sikes
*Assistant Examiner*—Hung X Dang
*Attorney, Agent, or Firm*—Vineet Kohli; Thomas R. Morrison

[57] ABSTRACT

An eyeglass frame secures first and second lens frames secured in fixed relation one to the other by a pair of super-elastic bridge pieces. The lens frames are a non-super elastic material. Bridges pieces of the eyeglass frames are a super-elastic alloy material. The bridge pieces have a surface coatings thereon of a silver solder compatible metal plating. The bridge pieces are silver soldered to the lens frames at locations where the silver solder compatible metal plating is present. In one embodiment, the super-elastic alloy material is made of a Ni-Ti-Co alloy material. Temple elements are attached to the lens frames. Each temple element includes a base with a pivoting member. Temple arms each having a silver solder compatible metal plating at its end are silver soldered at the plated ends to the pivoting members.

16 Claims, 3 Drawing Sheets

EYEGLASS FRAME AND METHOD OF MAKING SAME

The present application is a continuation in part of application Ser. No. 07/842,068, filed Feb. 26, 1992 now abandoned.

BACKGROUND OF THE INVENTION

The present invention relates to eyeglass frames and, more particularly, to eyeglass frames using a super elastic alloy material in the structure of the frame, as well as a method for making the eyeglass frames.

Generally, an eyeglass frame includes a pair of lens holders in which a user's prescription ground plastic or glass lenses are mounted. A bridge joins the lens holders in a fixed relation with each other. Temple elements engage temple arms of the eyeglass frame when the eyeglass frame is open. With the user's ears to support the lenses in front of the eyes, the temple arms generally are pivoted to the lens frames to allow the pivoting of the temple arms to a closed position against the lens frames when the user removes the eyeglasses and stores them in a pocket, purse or other place. Another bridge piece defining a support receivable on the user's nose also may be included.

It is desirable that eyeglass frames have a certain elastic quality. It is known to employ a super elastic alloy material for certain of the eyeglass frame components, particularly for bridge pieces and temple arms. Commonly, the lens frames and attachment members by which the temple arms are connected to the lens holders are non-super elastic alloy materials.

This dissimilarity of materials makes it impossible to directly solder super elastic bridge pieces to non-super elastic lens fames. The super elastic temple arms similarly cannot be soldered to non-super elastic attachment members. To enable joining the super elastic parts to the non-super elastic parts, end portions of bridge pieces are fitted into tubular members of, for example, nickel alloy. The tubular members are then deformed or crimped to hold the super elastic alloy bridge piece end portions. The crimped tube parts are then soldered to the non-elastic lens frames. The same practice is followed for securing super elastic alloy material temple arms to nonelastic attachment members.

Such soldering usually is accomplished by the use of soft solder. The connection does not require melting of the parent metal of the joined components.

However, the use of tubular members to join super-elastic alloy bridge piece end portions to non-super elastic parts substantially increases the cost of producing prior art eyeglass frames. Prior art tubular members impart non-affinity to the prior eyeglass frames. Additionally, the inability to directly solder super-elastic alloy components to non-super elastic alloy components yields less useful eyeglass frames which are unable to withstand great force and are liable to break easily upon slight impact.

The present invention aims at overcoming the aforementioned drawbacks of prior art eyeglass frames.

OBJECTS AND SUMMARY OF THE INVENTION

Accordingly, it is an object of the present invention to provide an eyeglass frame using a super elastic alloy material in the structure of the frame.

It is a further object of the present invention to provide a method of making eyeglass frames using a super elastic alloy material.

It is a still further object of the present invention to provide eyeglass frames which allow for joining super-elastic alloy material components with non-super elastic alloy components in an effective, yet simplified, manner.

It is a still further object of the invention to provide attractive eyeglass frames by eliminating unsightly structures.

Another object of the present invention is to make eyeglass frames more efficient by eliminating the use of tubular members which are used for joining prior art super-elastic parts to non-super elastic parts.

Briefly stated, there is provided an eyeglass frame which secures left and right lens frames in fixed relation one to the other by a pair of bridge pieces. The lens frames are a non-super elastic alloy material. Bridge pieces of the eyeglass frames are a super-elastic alloy material. The bridge pieces have surface coatings thereon of silver solder compatible metal plating. The bridge pieces are silver soldered to the lens frames at locations where the plating is present.

In one embodiment, the super-elastic alloy material is made of a Ni-Ti-Co alloy material. Temple elements are attached to the lens frames. Each temple element includes a base with a pivoting member. Temple arms each having a silver solder compatible metal plating, at its end are silver soldered at the plated ends to pivoting members.

In accordance with these and other objects of the invention, there is provided an eyeglass frame which includes left and right lens frames being a non-elastic alloy material. The eyeglass frame includes at least a first bridge piece for joining the left and right lens frames and for maintaining the left and right lens frames in fixed relation with one another.

The bridge piece has a surface coating thereon of a silver solder compatible metal plating. Left and right temple elements also are provided, These each include a base and a temple arm, the base being connected to its respective lens frame. The base has a pivoting member thereon. The temple arms are fixed to each pivoting member.

Each of the temple arms has a surface coating of silver solder compatible metal plating, which permits soldering of each temple arm to its respective pivoting member for free opening and being worn on a user's ear. The first bridge piece and each of the temple arms are a super elastic alloy material which is a Ni-Ti-Co alloy. The silver solder compatible metal plating of the bridge piece permits soldering the bridge piece to the lens flames with a silver solder.

According to feature of the invention, there is further provided a method for fabricating an eyeglass frame, which includes, forming bridge pieces for joining between both lens flames, and temple arms for free opening and closing to lens flames and for being worn on user's ears, respectively from a super elastic alloy material. This is followed by plating soldered parts of the bridge pieces and the temple arms; soldering soldered parts of the bridge pieces to the lens flames by a silver solder; and soldering soldered parts of the temple arms to a base member by a silver solder. The super elastic alloy material is made of a Ni-Ti-Co alloy.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

As used herein, "super elastic alloy material" means an alloy material possessing memory properties such that, if a formed shape thereof is bent or deformed by an external force applied thereto, the shape will restore to its original form on release of the deforming force.

Figure 3A:
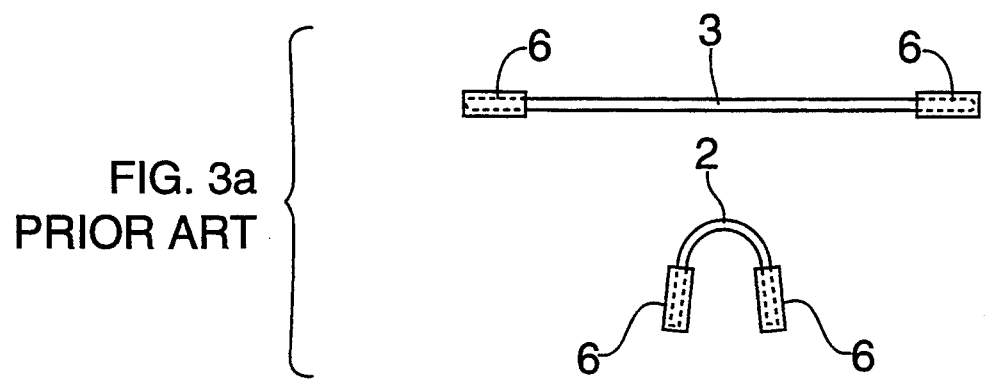
FIGS. 3(a)–3(c) depict prior art eyeglass frames.

Referring to FIG. 3(a), an inverted U-shaped first bridge piece 2, of super-elastic alloy, receives non-super elastic alloy tubular members 6 at each of its ends. A straight second bridge piece 3, of super-elastic alloy, also receives non-super elastic tubular members 6 at each of its ends.

Figure 3B:
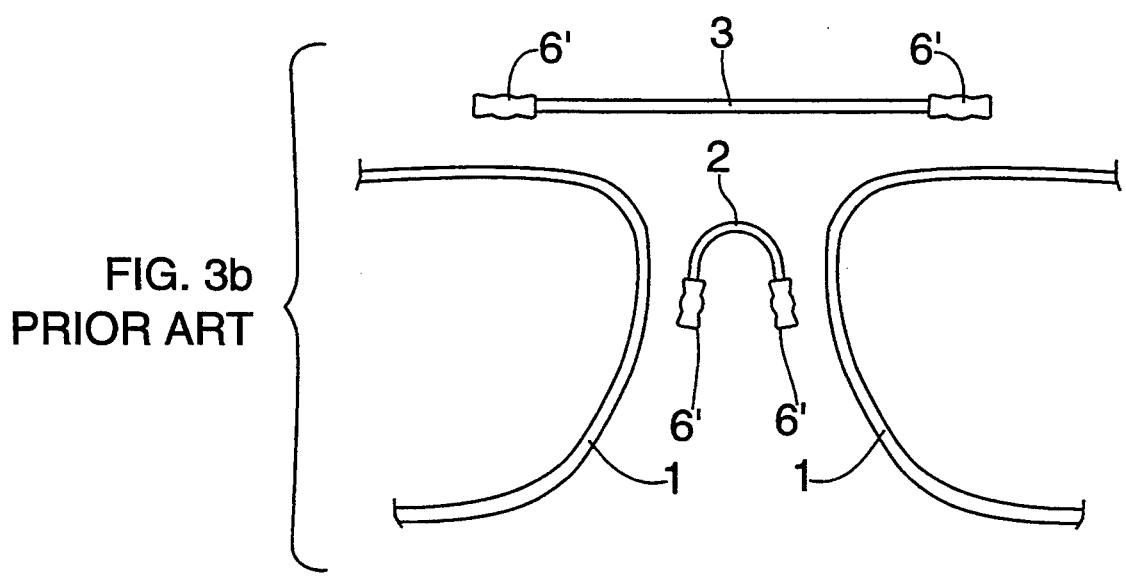

Referring now to FIG. 3(b), tubular members 6 of FIG. 3(a) are then crimped, as shown to produce tubular members 6' which secure the ends of first and second tubular members within them.

Figure 3C:
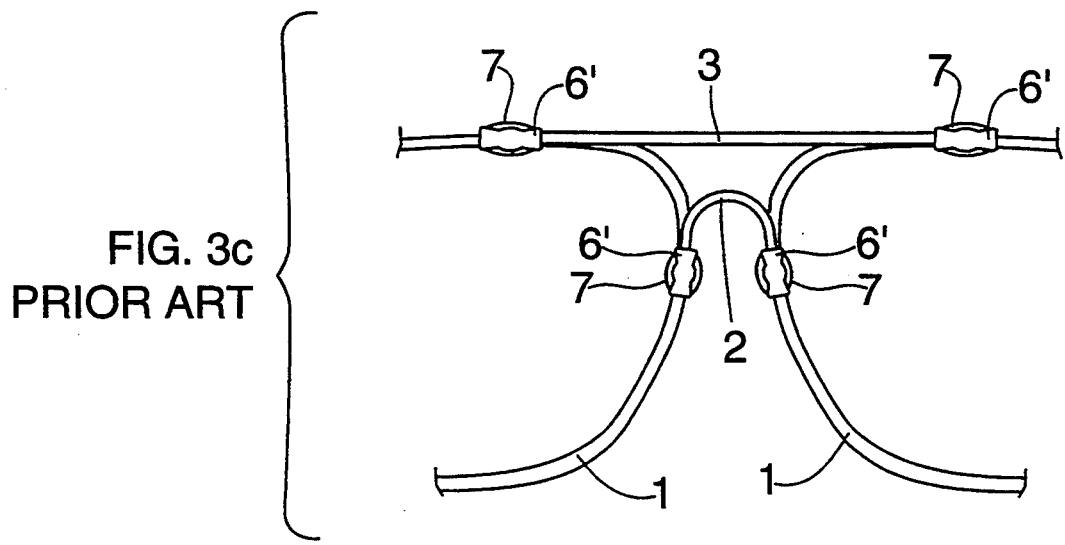

Referring now to FIG. 3(c), second bridge piece 3, is secured to lens frames 1, at peripheral portions of each of lens frame 1, e.g., top side of each lens frame. It is secured to lens frames 1, at opposite ends, by soldering to deformed tubular members 6'.

First bridge piece 2, is soldered to lens frame 1, at peripheral portions of each of lens frame 1, e.g., bottom sides of lens frame 1.

First bridge piece 2, is configured to define a nose piece which sits over a user's nose supporting the eyeglass flames 10. The solder used to secure first bridge piece 2 and second bridge piece 3 is usually of a tin/lead type soft solder.

A solder mass 7, occupies an interspace between confronting parts of the joined components such that there is no melt or intermingling of the parent material, resulting in a stronger bond.

Figure 1A:
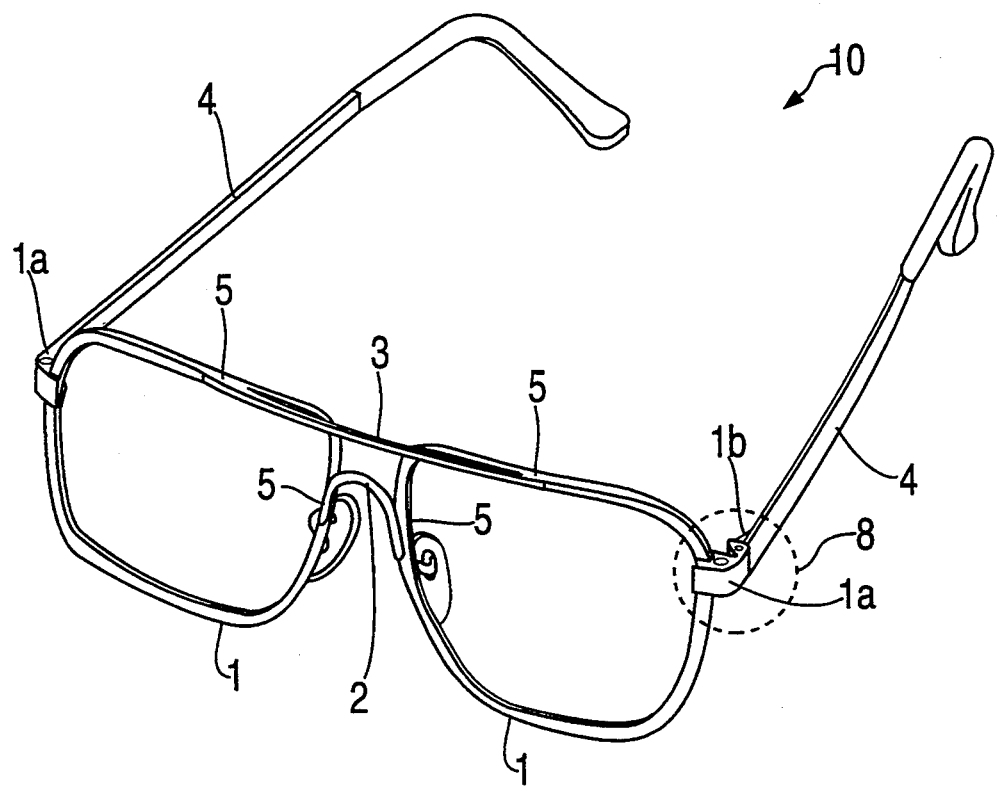
FIG. 1(a) is a perspective view of an eyeglass frame made in accordance with the method of the present invention.
Figure 1B:
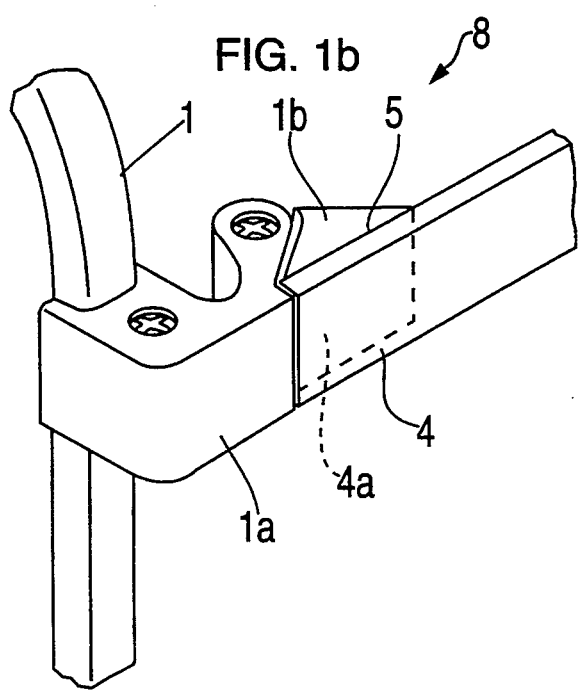
FIG. 1(b) is an enlarged fragmentary perspective view of the eyeglass frame portion shown in the dashed line circle of FIG. 1(a).

Referring now to FIGS. 1(a) and 1(b), an eyeglass frame 10, according to the present invention, includes first and second non-super elastic lens flames 1. Each eyeglass frame 10 has a temple element 8 attached thereto. The temple element 8, shown circled by a dashed circle in FIG. 1(a) and enlarged in FIG. 1(b), includes a base 1a attached to its respective lens frame 1. Base 1a, has a pivoting member 1b secured to an end of each temple arm 4. This feature permits temple arm 4 to swing between an open position (depicted) and a closed position (not shown). The temple arms 4, when open, support eyeglass frame 10 on a user's ears.

Each temple arms 4 is plated over a portion 4a thereof with a silver solder compatible metal plating material. The presence of the silver solder compatible metal plating material over portion 4a permits joining temple arms 4 to pivoting members 1b to form a silver solder joint 5.

Figure 2A:
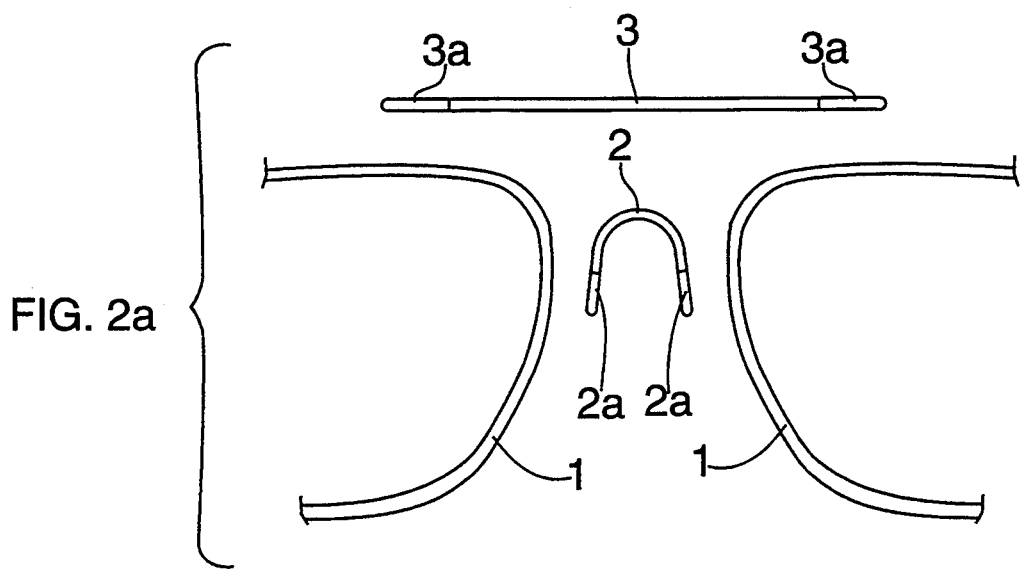
FIG. 2(a) is a fragmentary elevational view depicting the bridge piece and lens frames before they are joined together.
Figure 2B:
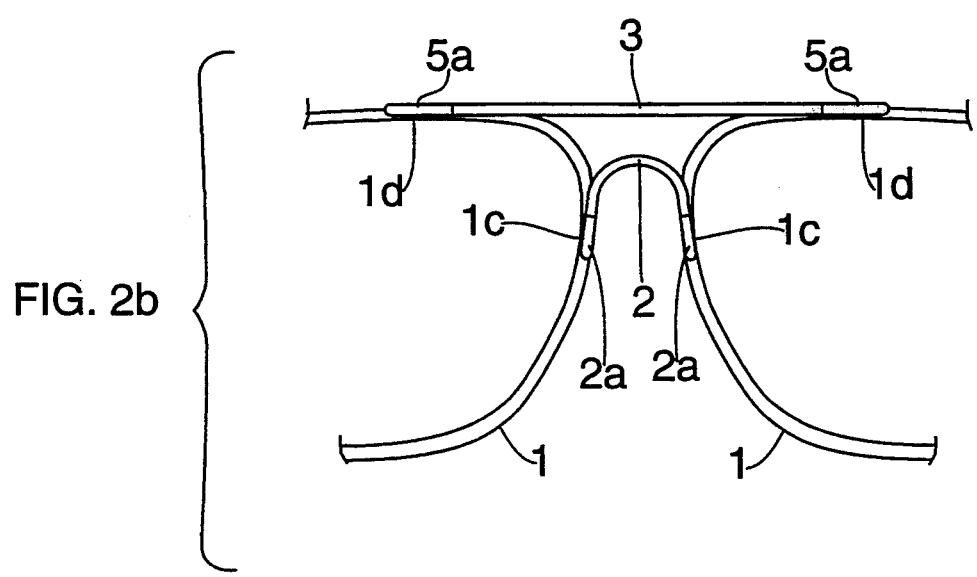
FIG. 2(b) shows the elements illustrated in FIG. 2(a) arranged in an assembly position.

Referring to FIG. 2(a), first bridge piece 2, and second bridge piece 3, have surface coatings 2a, 3a, respectively, applied thereto at their respective opposite ends where they contact lens frame 1. These contact points on lens flames 1 are similar to 1c and 1d as illustrated in FIG. 2(b). Surface coatings 2a and 3a are composed of a silver solder compatible metal plating material such as a nickel-based material mentioned previously for coating portion 4a.

Figure 2C:
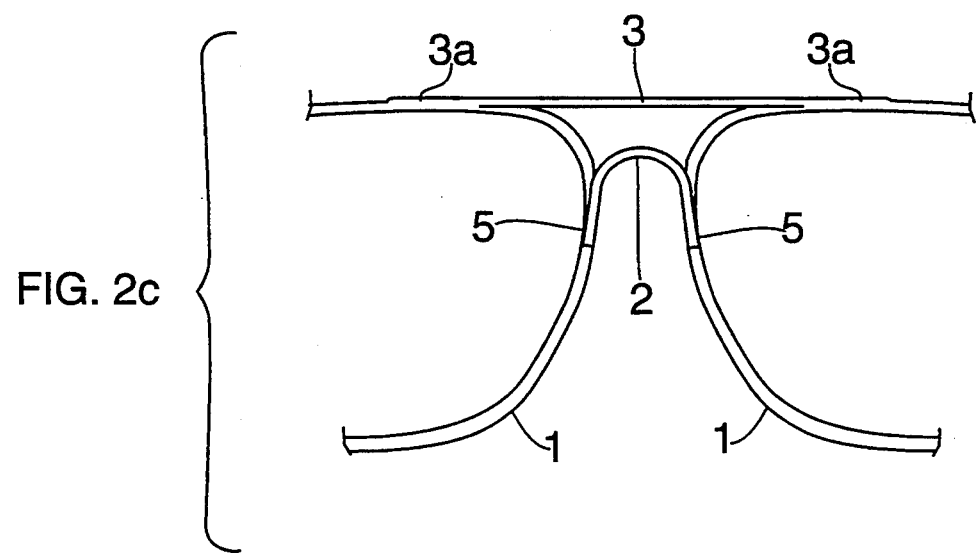
FIG. 2(c) shows the FIG. 2(b) elements after the individual parts are soldered together.

Referring to FIG. 2(b), second bridge piece 3 is silver soldered to lens frames 1, in the manner illustrated in FIG. 2(c) as a silver solder joint 5. A silver solder securement provides a stronger bond between the various components compared to prior art eyeglass frames.

Prior practice of using tin/lead soldering composition yields weaker eyeglass frames, due in part to the inferior bonding of dissimilar components. By contrast, the present invention allows for melting of parent material and interfusion of component materials.

Referring back to FIGS. 1(a) and 1(b), temple bases 1a, and pivoting members 1b, are made of non-super elastic alloy materials. First bridge piece 2 and second bridge piece 3, and temple arms 4, are made of super-elastic alloy materials.

Lens frames 1 are preferably made of a non-super elastic alloy, containing by weight percent, 65% nickel, 34.55% copper, 0.5% manganese composition, or a titanium base alloy. Other non-super elastic materials may be used.

Base 1a and pivoting member 1b are made of a non-super elastic material such as a nickel-copper-zinc alloy.

The super-elastic alloy materials of which first bridge piece 2, second bridge piece 3, and temple arms 4 are made include at least one alloy selected from the group consisting of nickel-titanium alloys, copper-zinc alloys, copper-aluminum-nickel alloys. Certain of the foregoing alloys may include cobalt. It is preferable to use a Ni-Ti-Co alloy material.

A preferable silver solder (not shown) used to join elements of super-elastic components of eyeglass frame 10 is one containing, by weight percent, about 62% Silver, 2% copper, 3% Zinc, 3% nickel and 30% cadmium.

Silver solder compatible metal plating material for coating various component parts of eyeglass frame 10, consists of materials preferably including nickel-based alloys. Those materials which are nickel plated are plated at a temperature in a range of, preferably, from about 50 to about 60 degrees Celsius.

By making the bridge pieces and temple arms with super-elastic alloy materials, the original shaped structure configuration of the eyeglass frame is assured in that any subsequent deformation such as a twisting between the lens frames produced by torsionally applied force is eliminated when the applied force is released. This means that accidental shape deformations, which in the past resulted in frame fracture, breakage or non-restorable shape alteration from the original configuration, are no longer a problem to continued serviceability and use of the eyeglasses.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An eyeglass frame comprising:
   left and right lens frames;
   said left and right lens frames being a non-super elastic alloy material;
   at least a first bridge piece for joining said left and right lens frames and for maintaining said left and right lens frames in fixed relation with one another;
   said at least a first bridge piece having a surface coating thereon of a silver solder compatible metal plating;
   left and right temple elements;
   each of said left and right temple elements including a base and a temple arm;
   said base being connected to its respective lens frame;
   a pivoting member on said base;
   a surface coating of silver solder compatible metal plating on each temple arm;
   said silver solder compatible metal plating on each temple arm permitting soldering said each temple arm to its respective pivoting member for free opening and for being worn on a user's ear;
   said at least a first bridge piece and each of said temple arms being a super-elastic alloy material;
   said super-elastic alloy material being a Ni-Ti-Co alloy; and
   said silver solder compatible metal plating said at least a first bridge piece permitting soldering said at least a first bridge piece to said lens frames with a silver solder.

2. An eyeglass frame according to claim 1, wherein:
   said non-super elastic alloy material contains, by percentage of weight:
   nickel (Ni)–65 percent;
   copper (Cu)–34.5 percent; and
   manganese (Mn)–0.5 percent.

3. An eyeglass frame according to claim 1, further comprising:
   a second bridge piece joined to said left and right lens frames;
   a surface coating of silver solder compatible metal plating on said second bridge piece;
   said second bridge piece being a super-elastic alloy material;
   said super-elastic alloy material being a Ni-Ti-Co alloy; and
   said silver solder compatible metal plating on said second bridge piece permitting soldering said second bridge piece to said left and right lens frames with a silver solder.

4. An eyeglass frame according to claim 3, wherein said silver solder compatible metal plating of said second bridge piece is a nickel based material.

5. An eyeglass frame according to claim 3, in which said second bridge piece is of inverted U-shape; and
   said silver solder compatible metal plating is present on a surface of said second bridge piece, along tip end portions of parallel legs of said inverted U-shape.

6. An eyeglass frame according to claim 1, wherein:
   said at least a first bridge piece is an elongated member; and
   said elongated member has a metal plating along at least two discrete length portions thereof.

7. An eyeglass frame according to claim 6, wherein:
   said at least two discrete length portions are at opposite ends of said at least a first bridge piece; and
   said at least a first bridge piece between said opposite end length portions being of substantially straight configuration.

8. An eyeglass frame according to claim 1, wherein said left and right lens frames:
   are fabricated from a non-super elastic alloy material; and
   said non-super elastic alloy material is made of at least one material selected from the group consisting of Ni, Cu and Mn.

9. An eyeglass frame according to claim 8, wherein:
   said non-super elastic alloy material contains, by percentage of weight:
   nickel (Ni)–65 percent;
   copper (Cu)–34.5 percent; and
   manganese (Mn)–0.5 percent.

10. An eyeglass frame according to claim 1, in which said silver solder contains, by percentage of weight:
    silver (Ag)–62 percent;
    copper (Cu)–2 percent;
    zinc (Zn)–3 percent;
    nickel (Ni)–3 percent; and
    cadmium (Cd)–30 percent.

11. An eyeglass frame according to claim 1, wherein:
    said base and its respective pivoting member are a non-super elastic alloy material; and
    said non-super elastic alloy material is a Ni-Cu-Zn alloy.

12. A method for producing an eyeglass frame, comprising the steps of:
    forming bridge pieces for joining between both lens flames and temple arms for free opening and closing to lens frames and for being worn on user's ears from a super-elastic alloy material made of Ni-Ti-Co alloy;
    plating soldered parts of said bridge pieces and said temple arms;
    soldering soldered parts of said bridge pieces to said lens frames by a silver solder; and
    soldering soldered parts of said temple arms to a base member by a silver solder.

13. The method of claim 12, wherein:
    said step of forming temple arms for free opening from a super-elastic alloy material includes;
    applying a surface coating of a silver solder compatible metal plating to an end of said temple arms; and
    silver soldering said ends of said temple arms to a pivoting member of a temple element.

14. The method of claim 12, wherein soldering soldered parts of said bridge pieces to said lens frames by a silver solder includes:
    positioning an elongated bridge piece to a front portion of said lens frames;
    plating an elongated member along at least two discrete length portions thereof where said at least two discrete length portions are at opposite ends of said elongated bridge piece;
    configuring said elongated bridge piece substantially straight between said opposite end length portions; and
    silver soldering said opposite ends of said elongated bridge piece to a left and right lens frames.

15. The method of claim 12, wherein:
    said step of forming said bridges includes applying a surface coating of a silver solder compatible metal plating to opposite end length portions of said elongated bridge piece and along tip end portions of parallel legs of said inverted U-shape bridge piece.

16. The method of claim 12, wherein the step of soldering soldered parts of said inverted U-shape bridge piece to said left and right lens frames by a silver solder includes:

positioning said inverted U-shape bridge piece so that said coated tip end portions of parallel legs of said inverted U-shape bridge piece contact said lens frames at a contact location such that a gap is maintained between said inverted U-shape bridge piece and said elongated bridge piece; and securing said tip ends to said lens frames at said contact location by a silver solder.

* * * * *